United States Patent [19]

Harazi

[11] Patent Number: 4,718,594
[45] Date of Patent: Jan. 12, 1988

[54] ICE CREAM CATCHER

[76] Inventor: Michele Harazi, 125 Keats Pl., Cherry Hill, N.J. 08003

[21] Appl. No.: 941,033

[22] Filed: Dec. 12, 1986

[51] Int. Cl.⁴ .............................................. B65D 3/28
[52] U.S. Cl. ................................. 229/1.5 H; D7/70; 220/96; 229/DIG. 7; 294/27.1
[58] Field of Search ............ D7/70, 76; 211/72; 220/94 R, 96; 229/1.5 H, DIG. 6, DIG. 7, 87 F; 294/27.1, 31.2; 248/146, 149, 150, 152, 174

[56] References Cited

U.S. PATENT DOCUMENTS

| | | | |
|---|---|---|---|
| 1,616,570 | 2/1927 | Boynton | 229/1.5 H |
| 1,920,995 | 8/1933 | Legge | 229/1.5 H |
| 1,938,113 | 12/1933 | Schoenfeld | 229/1.5 H |
| 2,314,935 | 3/1943 | Gutterman | 229/DIG. 6 |
| 2,321,519 | 6/1943 | Rubinoff | 229/1.5 H |
| 2,948,452 | 8/1960 | Grogan et al. | 229/Dig. 7 |
| 3,306,512 | 2/1967 | Pagnini | D7/70 |
| 3,351,258 | 11/1967 | Evantash | 229/1.5 H |
| 4,226,355 | 10/1980 | Helfrich, Jr. | 229/DIG. 7 |

Primary Examiner—Stephen Marcus
Assistant Examiner—Gary E. Elkins
Attorney, Agent, or Firm—Barnes & Thornburg

[57] ABSTRACT

Ice cream catcher having a collar rising from the center of a dish and including an improved flap seal extending into an aperture in the top of the collar.

6 Claims, 4 Drawing Figures

ICE CREAM CATCHER

BACKGROUND AND SUMMARY OF THE INVENTION

The present invention relates generally to ice creams and specifically to a catcher for melting ice cream.

Eating ice cream from an ice cream cone is very messy in that one cannot always eat the ice cream at the same rate in which it is melting. Thus there is a need for some sort of guard for the hand to protect it from the melting ice cream. Guards have been developed which range from a corrugated paper guard shown in U.S. Pat. No. 1,616,570 to unique ice cream cone having two portions acting as guard as shown in U.S. Pat. No. 1,938,113. A shield being inserted within the interior of the cone is illustrated in U.S. Pat. No. 4,226,355. Closed containers which receive the cone and encompass the bottom are illustrated in U.S. Pat. Nos. 1,920,995 and 3,351,258. More simplified versions of guards which extend radially outward (from the cone without encompassing the bottom are illustrated in U.S. Pat. Nos. 2,948,452 and 3,306,512.

The complete enclosures of the U.S. Pat. Nos. 1,920,995 and 3,351,258 avoid the problem of forming a tight seal between the cone and the catcher since the bottom is totally closed. But, they are expensive to the manufacturer. The more inexpensive manufactured catcher, illustrated specifically in U.S. Pat. No. 3,306,512, experience sealing problems between the cone and the catcher such that the accumulated melted ice cream will drip down between the cone and the central opening of the catcher.

Thus it is the object of the present invention to provide and improve ice cream catcher which provides an improved seal between the cone and the catcher.

Another object of the present invention is to proved an inexpensively ice cream catcher which provides a good seal between the cone and the catcher.

This and another objects of the invention are obtained by providing an ice cream catcher having a dish with a collar extending up from a center orifice therein and a flap structure which extends down through an aperture in the collar which engages and seals the cone extending through the aperture. The flap structure includes a bead extending around the interior of the collar in the aperture and a plurality of circumferially spaced fingers extending down from the bead. The collecting volume is an annulus defined between the collar and the dish. The dish has a generally concave base with substantially vertical rim extending upwardly from the base. This combination maximizes the volume with a minimum of radial extension about the cone.

Further objects, features, and advantages of the present invention will become more apparent from the following description when taken with the accompanying drawings which show, for purposes of illustration only, an embodiment embodiments in accordance with the present invention.

DETAILED DESCRIPTION OF THE DRAWINGS

Figure 1:
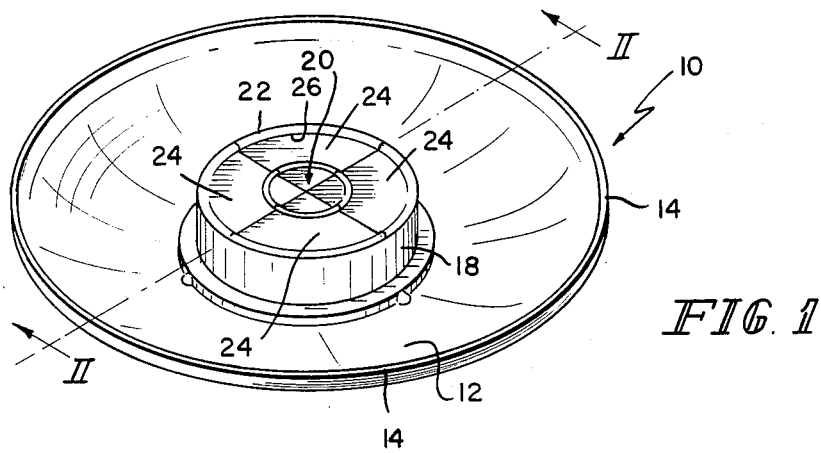
FIG. 1 is a prospective view of an ice cream catcher incorporating the principles of the present invention.
Figure 2:
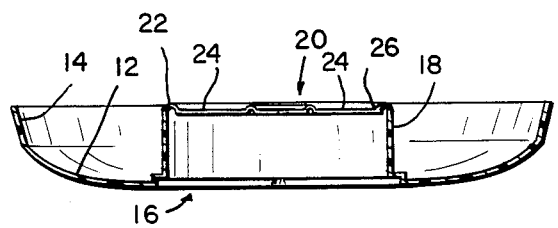
FIG. 2 is a cross-section that take long lines II—II of FIG. 1.

The ice cream catcher 10 is an integrally formed device made from thin wall plastic or any other substantially flexible material. The ice cream catcher 10 includes a concave dish base 12 with an upwardly extending substantially vertical rim 14. An orifice 16 is provided at the center of the dish 12 and a collar 18 extends upwardly therefrom. The collar 18 in combination with the dish 12 and rim 14 forms an annulus volume which catches the melting ice cream. The height of collar 18 and of the dish 12 and rim 14 provide a deep annular volume with relative small radial extension. This allows the structure to catch all the anticipated melted ice cream without undue real extension.

Figure 3:
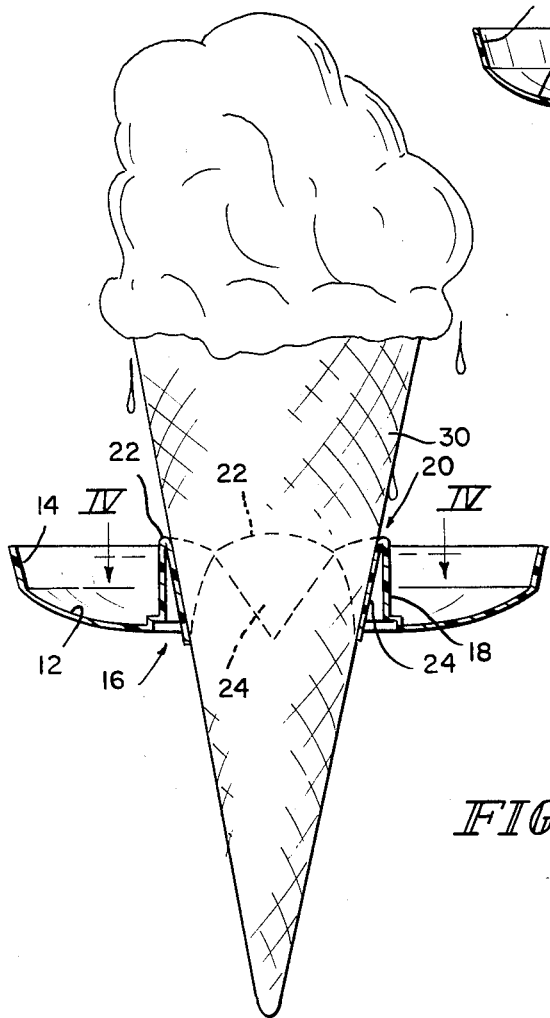
FIG. 3 is a cross-sectional view of FIG. 2 with a cone inserted therein.
Figure 4:
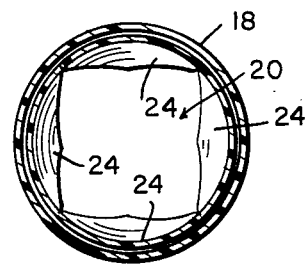
FIG. 4 is a cross-sectional view along line IV—IV of FIG. 3.

An opening 20 on the top of collar 18 receives an ice cream cone 30 as illustrated in FIG. 3. Extending around the interior of the collar 18 at the aperture 20 is a bead 22 with a plurality of circumferially spaced fingers 24 extending therefrom into the aperture 20. The bead 22 provide a 180° change of direction from the wall of collar 18 so that the fingers extend from 90° in FIG. 1 to approximately 180° in FIG. 3. A crease 26 is provided at the juncture of the bead 22 and the fingers 24. This crease limits the bending or flexing of the combined fingers 24 and bead 22 to the bead 22. The fingers 24 may be formed as separated molded elements or may be formed as a single molded element and subsequently cut into individual elements.

As illustrated in FIG. 3, a cone 30 is inserted through aperture 20 of the collar 18 deflecting fingers 24. The force causes the bending of the bead 22. When the cone has come to rest, the bead 22 has been deformed and forms a seal about the cone 30. The fingers 24 are resiliently biased against the cone 30. A slight rotation of the cone relative to the catcher 10 improves the seal.

The inwardly extending bead 22 with the downwardly extending fingers 24 provided a seal without changing or deforming the structure of the collar 18. The insertion of the cone 30 pushes the bead outwardly towards the rigid wall of collar 18 and results in a scalloping effect of the bead as shown in FIG. 3. This provides a non-planar seal at different heights along the cone and collar. Since cones 30 are generally tapered, the quality of the seal improves from the valley to the crest of the scalloped bead 22. This is distinct from the prior art wherein the extension of the cone through an aperture causes the fingers to extend outwardly into open space thereby increasing the opening and not aiding the sealing. The approximate 180 degree reversal of the fingers from the collar through the bead increases the efficiency of the seal.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Ice cream catcher comprising:
   a dish having a center, an interior and an orifice in the center,
   a collar encompassing said orifice and having a wall extending upwardly from the interior of said dish to form an annulus catching volume with said dish, an aperture in said collar coaxial with said orifice, and flap means extending from the top of said collar down into said collar and through said aperture for engaging and sealing a cone inserted through said aperture.

2. An ice cream catcher according to claim 1, wherein said flap means includes a bead extending around the interior of said collar in said aperture and a plurality of circumferially spaced fingers extending down from said bead through said aperture.

3. An ice cream catcher according to claim 2, including a crease at the juncture of said fingers and said bead for limiting the bending of said flap means with respect to said bead.

4. An ice cream catcher according to claim 1, wherein said dish includes a concaved base with a substantially vertical rim extending upwardly from said base.

5. An ice cream catcher according to claim 1, wherein said flap means extends between 90° to 180° relative to the walls of said collar.

6. An ice cream catcher according to claim 1, wherein said flap means forms a non-planar seal with a cone inserted through said aperture.

* * * * *